(12) United States Patent
Xing et al.

(10) Patent No.: US 12,116,716 B2
(45) Date of Patent: Oct. 15, 2024

(54) SPRING BEARING BEAM AND FRAME OF A LAUNDRY TREATMENT APPARATUS

(71) Applicants: QINGDAO HAIER DRUM WASHING MACHINE CO., LTD., Shandong (CN); HAIER SMART HOME CO., LTD., Shandong (CN)

(72) Inventors: Benfu Xing, Shandong (CN); Zhiwei Zhao, Shandong (CN); Shaolei Yi, Shandong (CN); Leilei Ai, Shandong (CN); Wenwei Li, Shandong (CN)

(73) Assignees: QINGDAO HAIER DRUM WASHING MACHINE CO., LTD., Shandong (CN); HAIER SMART HOME CO., LTD., Shandong (CN)

( * ) Notice: Subject to any disclaimer, the term of this patent is extended or adjusted under 35 U.S.C. 154(b) by 992 days.

(21) Appl. No.: 16/977,199

(22) PCT Filed: Mar. 1, 2019

(86) PCT No.: PCT/CN2019/076663
§ 371 (c)(1),
(2) Date: Nov. 6, 2020

(87) PCT Pub. No.: WO2019/166007
PCT Pub. Date: Sep. 6, 2019

(65) Prior Publication Data
US 2021/0054961 A1 Feb. 25, 2021

(30) Foreign Application Priority Data
Mar. 2, 2018 (CN) .......................... 201810176062.6

(51) Int. Cl.
*D06F 39/12* (2006.01)
*A47B 95/00* (2006.01)
(Continued)

(52) U.S. Cl.
CPC ............ *D06F 39/12* (2013.01); *A47B 95/008* (2013.01); *A47B 96/14* (2013.01); *D06F 29/005* (2013.01);
(Continued)

(58) Field of Classification Search
CPC .......... D06F 37/20; D06F 39/12; D06F 58/06; A47B 95/008; A47B 96/14; F16M 13/02
(Continued)

(56) References Cited

U.S. PATENT DOCUMENTS 7,624,745 B2 * 12/2009 Welch ................. A47L 15/4251
68/3 R
2006/0225466 A1 * 10/2006 Lee ......................... D06F 39/12
68/24
(Continued)

FOREIGN PATENT DOCUMENTS

CN 101031683 A 9/2007
CN 104278480 A 1/2015
(Continued)

OTHER PUBLICATIONS

International Search Report (PCT/ISA/210) issued on Jun. 11, 2019, by the State Intellectual Property Office of the P.R. China as the International Searching Authority for International Application No. PCT/CN2019/076663.
(Continued)

*Primary Examiner* — James O Hansen
(74) *Attorney, Agent, or Firm* — Buchanan Ingersoll & Rooney PC

(57) ABSTRACT

A frame of a laundry treatment apparatus includes a spring bearing beam, which includes a body with a strip-shape, a first connection structure is disposed on an upper side of the body, a second connection structure is disposed on a lower side of the body, and the body is fixedly connected with a (Continued)

reinforcing member arranged on the frame via the first connection structure and/or the second connection structure. Preferably, the first connection structure and the second connection structure are symmetrically disposed on the upper side and the lower side of the body. A left side and a right side of the spring bearing beam are used interchangeably, and in an actual assembly process, there is no need to differentiate between the left and the right positions of the spring bearing beam, and only a back side and a front side of the bearing beam need differentiation.

9 Claims, 8 Drawing Sheets

(51) Int. Cl.
    *A47B 96/14*         (2006.01)
    *D06F 29/00*         (2006.01)
    *D06F 37/20*         (2006.01)
    *D06F 58/06*         (2006.01)
    *D06F 58/20*         (2006.01)
    *F16M 13/02*        (2006.01)
    *D06F 37/22*         (2006.01)

(52) U.S. Cl.
    CPC .............. *D06F 37/20* (2013.01); *D06F 58/06* (2013.01); *D06F 58/20* (2013.01); *F16M 13/02* (2013.01); *D06F 37/22* (2013.01)

(58) Field of Classification Search
    USPC ............................................ 312/228; 68/3 R
    See application file for complete search history.

(56) References Cited

U.S. PATENT DOCUMENTS

| | | | |
|---|---|---|---|
| 2009/0121594 A1* | 5/2009 | Sans Rovira | D06F 37/22 248/346.03 |
| 2009/0178985 A1* | 7/2009 | Sempliner | H05K 7/1461 211/26 |
| 2011/0135448 A1* | 6/2011 | Chen | F04D 29/601 415/119 |
| 2016/0160420 A1* | 6/2016 | Lv | D06F 31/00 68/27 |

FOREIGN PATENT DOCUMENTS

| | | |
|---|---|---|
| CN | 204138933 U | 2/2015 |
| CN | 106319855 A | 1/2017 |
| CN | 106436200 A | 2/2017 |
| CN | 106917234 A | 7/2017 |
| CN | 208151676 U | 11/2018 |
| DE | 112013007225 B4 | 7/2019 |
| GB | 103696 A | 2/1917 |
| JP | H053987 A | 1/1993 |
| JP | 2016120196 A | 7/2016 |
| JP | 2017006306 A | 1/2017 |

OTHER PUBLICATIONS

Written Opinion (PCT/ISA/237) issued on Jun. 11, 2019, by the State Intellectual Property Office of the P.R. China as the International Searching Authority for International Application No. PCT/CN2019/076663.

\* cited by examiner ature and the second connection structure are symmetrically arranged in up and down direction, a left side and a right side of the spring bearing beam are used interchangeably, and in an actual assembly process, there is no need to differentiate between the left side and the right side of the spring bearing beam, and only a back side and a front side of the bearing beam need differentiation, thereby saving time of adjusting a location of the bearing beam in the assembly process, and improving working efficiency.

SPRING BEARING BEAM AND FRAME OF A LAUNDRY TREATMENT APPARATUS

TECHNICAL FIELD

The present disclosure relates to the field of home appliances, and particularly relates to a spring bearing beam and a frame of laundry treatment apparatus that are easily assembled.

BACKGROUND

Existing laundry treatment apparatus has various internal structures, and the complex internal structures lead to a complex assembly process and low assembly efficiency of workers, and increase production costs. The existing laundry treatment apparatus such as a washing machine or a dryer includes a frame and laundry treatment tubs. The laundry treatment tubs include an outer tub and an inner tub that can be rotationally disposed inside the outer tub. An upper portion of the outer tub is hooked, by using a suspension spring, to a spring bearing beam fixed on reinforcing members on the frame, and a bottom portion of the outer tub is supported by a support spring disposed on a bottom portion of the frame.

Two sides of an existing spring bearing beam are respectively provided with a screw hole to fix the spring bearing beam to sheet metal members of a frame by using fasteners. First, only one fixing structure (screw hole) is disposed on one side of the spring bearing beam, which has poor fixation effect. Especially in the process of transportation or violent movement of the inner tub, the spring bearing beam is easily detached from the frame because force is applied on the fixing structures on the two sides of the spring bearing beam, leading to an accident. On the other hand, the existing spring bearing beam is asymmetrically designed. In an actual assembly process, an operator needs to adjust a location of the spring bearing beam for assembly, and the operator needs to adjust locations of a front side, a back side, a left side, and a right side of the spring bearing beam, to properly assemble the spring bearing beam. In other words, the spring bearing beam can be fixed to reinforcing members on the frame in only one gesture. As a result, during actual operation, an assembly time of the operator is wasted, and the operator first needs to recognize the gesture thereof and adjust a location of the spring bearing beam to locate and assemble the spring bearing beam.

In view of this, the present disclosure is proposed.

SUMMARY

A technical problem to be solved by the present disclosure is to overcome deficiency of the prior art. The present disclosure provides a spring bearing beam. A first connection structure and a second connection structure are respectively disposed on an upper side and a lower side of the spring bearing beam, and the spring bearing beam is fixedly connected with reinforcing members on a frame of a laundry treatment apparatus by using the first connection structure and/or the second connection structure. When the spring bearing beam is fixed to the reinforcing members on the frame by using both the first connection structure and the second connection structure, the fixing effect of the spring bearing beam is improved. When the first connection structure and the second connection structure are symmetrically arranged in up and down direction, a left side and a right side of the spring bearing beam are used interchangeably, and in an actual assembly process, there is no need to differentiate between the left side and the right side of the spring bearing beam, and only a back side and a front side of the bearing beam need differentiation, thereby saving time of adjusting a location of the bearing beam in the assembly process, and improving working efficiency.

To solve the foregoing technical problem, a basic concept of technical solutions used in the present disclosure is as follows:

A spring bearing beam includes a body with a strip-shape. A first connection structure is disposed on an upper side of the body, a second connection structure is disposed on a lower side of the body, and the body is fixedly connected with a reinforcing member arranged on a frame of a laundry treatment apparatus via the first connection structure and/or the second connection structure.

In the foregoing solution, the body may be fixedly connected to the reinforcing member on the frame of the laundry treatment apparatus by using the first connection structure and/or the second connection structure. When the body is fixed to the reinforcing member on the frame by using both the first connection structure and the second connection structure, the fixing stability of the spring bearing beam is improved.

Preferably, the first connection structure includes two connection structures respectively located at two ends of the upper side of the body, and the second connection structure includes two connection structures that are respectively located at two ends of the lower side of the body. The first connection structure and the second connection structure may be a same connection structure or different connection structures.

Preferably, the first connection structure and the second connection structure are the same structure.

Preferably, the two connection structures of the first connection structure on the upper part of the body and the two connection structures of the second connection structure on the lower part of the body are symmetrically disposed on the upper side and the lower side of the body in up and down direction.

In the foregoing solution, when the first connection structure and the second connection structure are symmetrically arranged in up and down direction, a left side and a right side of the spring bearing beam can be used interchangeably, and in an actual assembly process, there is no need to differentiate between the left side and the right side of the spring bearing beam, and only a back side and a front side of the bearing beam need differentiation, thereby saving time of adjusting a location of the bearing beam in the assembly process, and improving working efficiency.

Preferably, the first connection structure includes through holes disposed on edges of the two ends of the upper side of the body, and the upper side of the body is fixed on the reinforcing member on the frame by fasteners through the through holes, or the first connection structure includes contact portions, located on edges of the two ends of the upper side of the body, in contact with the reinforcing member on the frame, and the contact portions are welded onto the corresponding reinforcing member; and/or the second connection structure includes through holes disposed on edges of the two ends of the lower side of the body, and the lower side of the body is fixed to the reinforcing member on the frame by fasteners through the through holes, or the second connection structure includes contact portions, located on edges of the two ends of the lower side of the body, in contact with the reinforcing member on the frame, and the contact portions are welded onto the corresponding reinforcing member.

Preferably, a first spring hooking portion is disposed on the body in correspondence to the first connection structure, a second spring hooking portion is disposed in correspondence to the second connection structure, the first spring hooking portion and the first connection structure are located on a same side of the body, and the second spring hooking portion and the second connection structure are located on a same side of the body.

In the foregoing solution, when the spring bearing beam is fixed on the reinforcing member on the frame by using the first connection structure, the first spring hooking portion is used to hook a spring, and when the spring bearing beam is fixed on the reinforcing member on the frame by using the second connection structure, the second spring hooking portion is used to hook a spring; or when the spring bearing beam is fixed to the reinforcing member on the frame by using both the first connection structure and the second connection structure, a spring hooking portion corresponding to a connection structure in a higher position in the first connection structure and the second connection structure is used to hook a spring.

Preferably, the two spring hooking portions are symmetrically disposed on the body in up and down direction, so that after the spring bearing beam is fixed on the reinforcing member on the frame, the spring hooking portion corresponding to the first connection structure or the second connection structure being above the other one is used to hook the spring.

In the foregoing solution, the two spring hooking portions are symmetrically disposed in up and down direction, so that when the first connection structure is higher than the second connection structure, the first spring hooking portion is used to hook the spring, and when the second connection structure is higher than the first connection structure, the second spring hooking portion is used to hook the spring.

Preferably, a projection portion of strip-shaped is formed through stamping towards a side on a middle portion of the body in a length direction of the body, the two spring hooking portions include two notches that are longitudinally symmetrically formed on the projection portion. And the first connection structure and the second connection structure are respectively disposed on a planar structure above the projection portion and a planar structure below the projection portion on the body. Preferably, irregular structures are formed on surfaces of side walls and a top wall of the projection portion, wherein the irregular structures include multiple uneven planes, and the planes transit smoothly or non-smoothly.

In the foregoing solution, the projection portion has an irregular structure, helping to increase strength of the spring bearing beam. The body of the spring bearing beam is a strip-shaped plate structure, the projection portion is formed through stamping in the length direction of the strip-shaped structure towards the side perpendicular to the body. The projection portion is a strip-shaped structure located on the middle portion of the body, so that the spring bearing beam is symmetrically arranged in up and down direction. Therefore, the left side and the right side of the spring bearing beam can be used interchangeably, and in the actual assembly process, there is no need to differentiate between the left side and the right side of the spring bearing beam, thereby improving assembly efficiency.

Preferably, the strip-shaped projection portion includes the side walls and the top wall, a transition between the side wall and the top wall is unsmooth, and the two spring hooking portions respectively include a first notch formed on the side wall on a side of the projection portion of strip-shaped and the connected top wall and a second notch formed on the side wall on the other side of the projection portion of strip-shaped and the connected top wall.

In the foregoing solution, the first spring hooking portion includes the first notch formed on the upper side wall and the connected top wall of the projection portion, so that the first notch is used to hook the spring when the first connection structure is higher than the second connection structure. Because the notch is formed on the upper side wall of the projection portion, a hook on an end portion of the spring is inserted into the notch from top to bottom, and is supported by the top wall. Similarly, the second spring hooking portion includes the second notch formed on the lower side wall and the connected top wall of the projection portion, wherein the first notch is not communicated with the second notch, and the first notch and the second notch are separated by the top wall, so that the second notch is used to hook a spring when the second connection structure is higher than the first connection structure. The hook on the end portion of the spring is inserted into the second notch on the side wall of the projection portion from top to bottom, and is supported by a portion of the top wall between the first notch and the second notch.

Preferably, an avoidance structure for avoiding the spring is further disposed on the body, so that after the spring is hooked to a spring hooking portion, there is a gap between a helical segment of the spring and the body.

In the foregoing solution, because portions of the body on two sides of the projection portion have planar structures, when the spring is hooked to the spring bearing beam, an angle of inclination between the spring and the planar structures (namely, vertical planes) on the two sides of the projection portion is relatively small, and the spring is easily in frictional contact with the planar portions, and noise is easily generated, which does not facilitate hooking stability of the spring. Therefore, in the present disclosure, the avoidance structure is disposed to prevent friction between the planar portions and the spring, and stably hook the spring to the spring bearing beam.

Preferably, the avoidance structure is two concave portions symmetrical that are formed through local curving-in on upper and lower sides of a surface of the body facing to the spring, and there is a gap between the spring and a surface of the concave portion located at the lower side of the bearing beam when the spring is hooked to the spring hooking portion.

Preferably, the two concave portions are respectively located on the planar structure of the body above the projection portion and the planar structure of the body below the projection portion, and extend from the projection portion to edges of the body. The extension directions of the two concave portions are perpendicular to the projection portion, and widths of the concave portions are gradually increased from edges of the projection portion to the edges of the body, to prevent contact between the helical segment of the spring and the body.

Further, the top wall of the projection portion has different heights, and locations of the first spring hooking portion and the second spring hooking portion on the top wall are higher than adjacent portions on the top wall. From the view of a cross-section of the spring bearing beam, a ratio of a width of the projection portion to a width of the planar structure above or below the projection portion is 1:2 to 3:2. Preferably, the ratio of the width of the projection portion to the width of the planar structure above or below the projection portion is 1:1. The inventors have proven through a large quantity of experiments that when the ratio of the width of the projection portion to the width of the planar structure above or below the projection portion is 1:2 to 3:2, the spring bearing beam has relatively good bearing strength, and meets a safety condition.

Another objective of the present disclosure is to provide a frame of a laundry treatment apparatus. The frame includes the foregoing spring bearing beam.

Compared with the prior art, after the foregoing technical solutions are used, the present disclosure has the following beneficial effects:

1. The spring bearing beam in the present disclosure includes the body of strip-shaped, the first connection structure is disposed on the upper side of the body, the second connection structure is disposed on the lower side of the body, and the body is fixedly connected to the reinforcing member on the frame of the laundry treatment apparatus by using the first connection structure and/or the second connection structure. Preferably, the first connection structure and the second connection structure are symmetrically disposed on the upper side and the lower side of the body. The left side and the right side of the spring bearing beam are used interchangeably, and in the actual assembly process, there is no need to differentiate between the left side and the right side of the spring bearing beam, and only the back side and the front side of the bearing beam need differentiation, thereby saving time of adjusting the location of the bearing beam in the assembly process, and improving working efficiency.

2. In the present disclosure, the projection portion of strip-shaped is formed through stamping towards the side on the middle portion of the body in the length direction of the body. The two spring hooking portions include two notches that are formed on the projection portion up and down symmetrically, and the first connection structure and the second connection structure are respectively disposed on the planar structure above the projection portion and the planar structure below the projection portion on the body. Preferably, the irregular structures are formed on the surfaces of the side walls and the top wall of the projection portion. The irregular structure includes multiple uneven planes, and the planes transit smoothly or non-smoothly. The projection portion has the irregular structure, helping to increase strength of the spring bearing beam. The body of the spring bearing beam is the strip-shaped plate structure, the projection portion is formed through stamping in the length direction of the strip-shaped structure towards the side perpendicular to the body. The projection portion is the strip-shaped structure located on the middle portion of the body, so that the spring bearing beam is symmetrical up and down. Therefore, the left side and the right side of the spring bearing beam can be used interchangeably, and in the actual assembly process, there is no need to differentiate between the left side and the right side of the spring bearing beam, thereby improving assembly efficiency.

3. In the present disclosure, the avoidance structures for accommodating the spring are further disposed on the body of the spring bearing beam, so that after the spring is hooked to the spring hooking portion, there is a gap between the helical segment of the spring and the body. Because the portions of the body on the two sides of the projection portion are the planar structures, when the spring is hooked to the spring bearing beam, an angle of inclination between the spring and the planar structures (namely, the vertical planes) on the two sides of the projection portion is relatively small, the spring is easily in frictional contact with the planar portions, and noise is easily generated, which does not facilitate hooking stability of the spring. Therefore, in the present disclosure, the avoidance structures are disposed, to prevent friction between the planar portions and the spring, and stably hook the spring to the spring bearing beam. The avoidance structures are two symmetrical concave portions that are formed through local curving-in on the upper and lower sides of the surface facing to the spring on the body, and there is a gap between the spring and the surface of the concave portion located on the lower side of the bearing beam when the spring is hooked to the spring hooking portion. The two concave portions are respectively located on the planar structure of the body above the projection portion and the planar structure of the body below the projection portion. The two concave portions extend from the projection portion to the edges of the body. The extension directions are perpendicular to the projection portion, and the widths of the concave portions are gradually increased from the edges of the projection portion to the edges of the body, to prevent contact between the helical segment of the spring and the body.

The following further describes in detail specific implementations of the present disclosure with reference to the accompanying drawings.

BRIEF DESCRIPTION OF THE DRAWINGS

As a part of this application, the accompanying drawings are used to provide further understanding of the present disclosure. Exemplary embodiments of the present disclosure and descriptions thereof are used to explain the present disclosure, but do not constitute improper limitation on the present disclosure. Apparently, the accompanying drawings in the following descriptions show merely some embodiments, and a person of ordinary skill in the art may still derive other accompanying drawings from these accompanying drawings without creative efforts. In the accompanying drawings.

Figure 1:
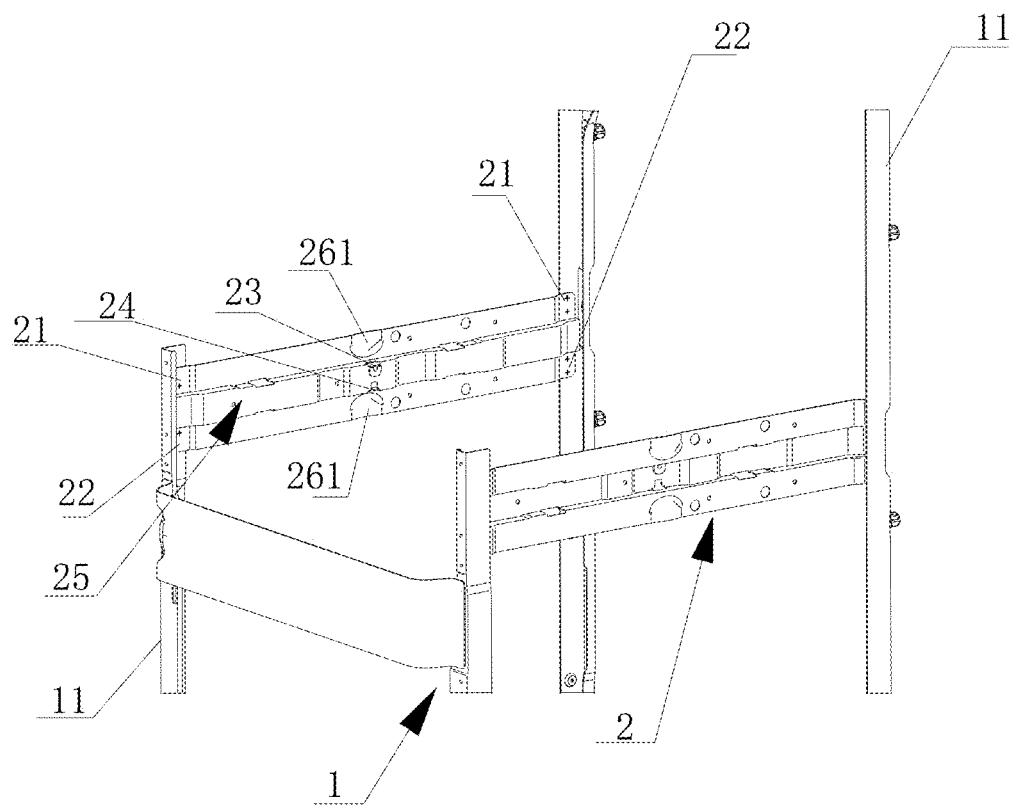
FIG. 1 is a schematic structural diagram of a frame inside the laundry treatment apparatus.
Figure 2:
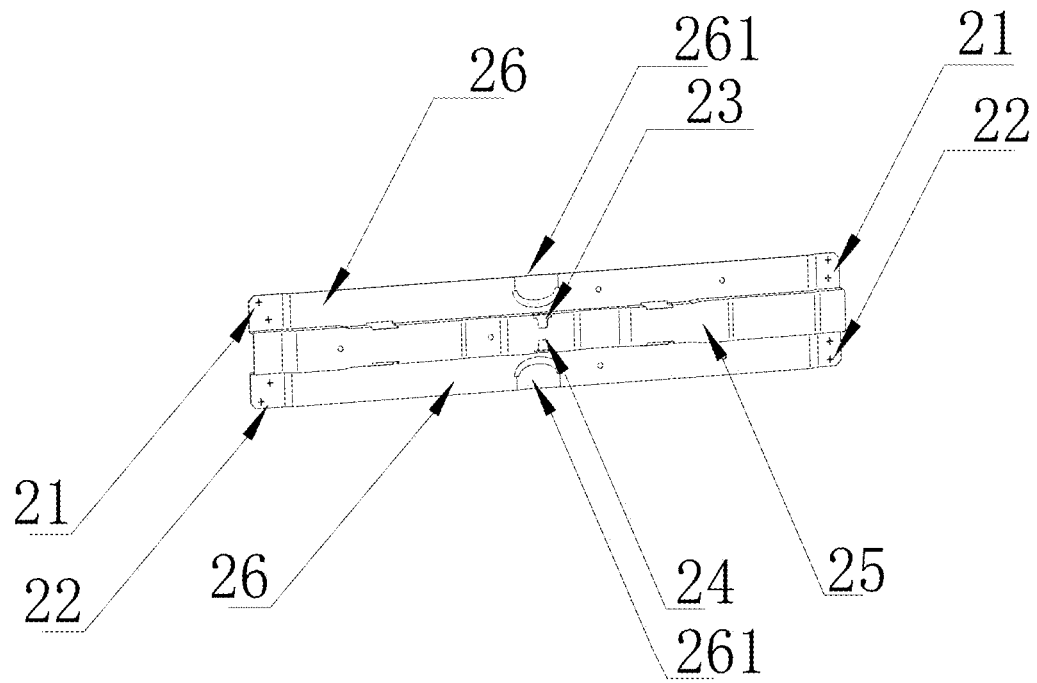
FIG. 2 is a schematic structural diagram of a spring bearing beam in FIG. 1.
Figure 3:
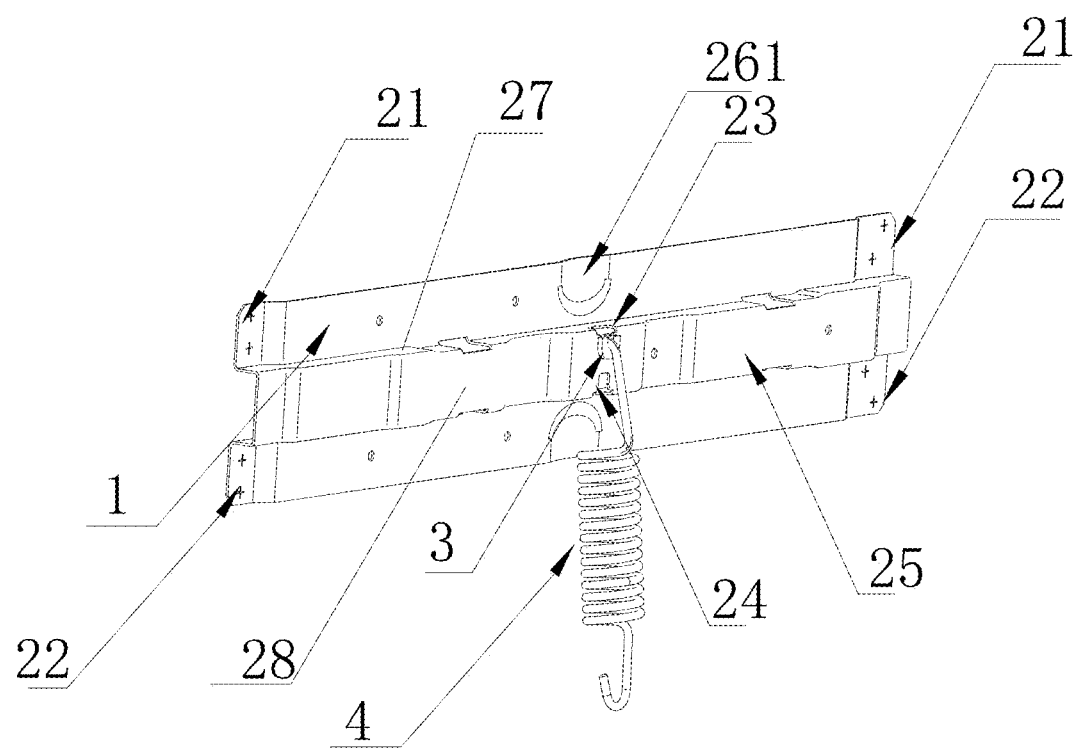
FIG. 3 is a diagram of another view of FIG. 2.
Figure 4:
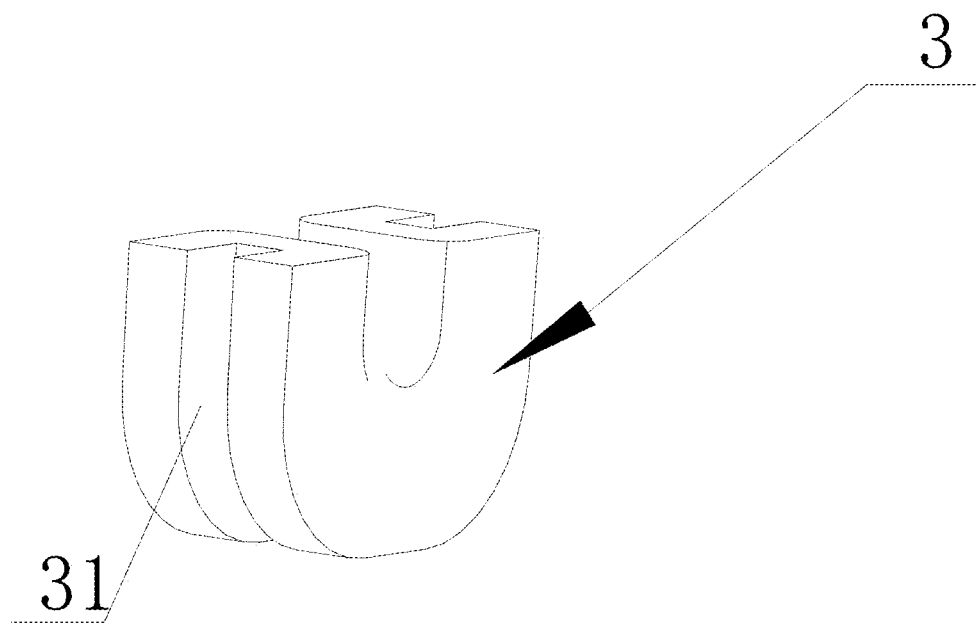
FIG. 4 is a schematic structural diagram of a spring holder.

In the drawings: 1. Frame; 11. Sheet metal member; 2. Spring bearing beam; 21. First connection structure; 22. Second connection structure; 23. First spring hooking portion; 24. Second spring hooking portion; 25. Projection portion; 26. Planar structure; 27. Side wall; 28. Top wall; 261. Concave portion; 3. Spring holder; 31. Insertion groove; 4. Spring; 5. Laundry handling tub; 101. Upper reinforcing member; 102. Front-left vertical beam; 103. Left reinforcing member; 104. Front-right vertical beam; 105. Lower reinforcing member; 106. Base; 107. Rear-right vertical beam; 108. Right reinforcing member; 109. Rear reinforcing member; 110. Rear-left vertical beam; 111. Bottom plate; 112. Flange; 113. Front side plate; 114. Avoidance portion; 115. First vertical portion; 116. Inclination portion; 117. Second vertical portion; 118. Bent portion; and 119. Avoidance space.

It should be noted that the accompanying drawings and the text are not intended to limit a conceptual scope of the present disclosure in any manner, but are intended to describe concepts of the present disclosure for a person skilled in the art by referencing specific embodiments.

DETAILED DESCRIPTION OF THE EMBODIMENTS

To make the objectives, technical solutions, and advantages of the embodiments of the present disclosure clearer, the following clearly and completely describes the technical solutions in the embodiments with reference to the accompanying drawings in the embodiments of the present disclosure. The following embodiments are used to describe the present disclosure, but are not used to limit the scope of the present disclosure.

In the descriptions of the present disclosure, it should be noted that orientation or location relationships indicated by terms such as "upper", "lower", "inner", and "outer" are orientation or location relationships indicated based on the accompanying drawings, and are merely used to facilitate description of the present disclosure and simplification of descriptions, but are not used to indicate or imply that an indicated apparatus or element must have a specific orientation or must be constructed and operated in a specific orientation, and therefore cannot be understood as limitation on the present disclosure.

In the descriptions of the present disclosure, it should be understood that, unless otherwise specified and defined, the terms "mount" and "connect" should be comprehended in a broad sense. For example, these terms may be comprehended as being fixedly connected, detachably connected, or integrally connected; mechanically connected; electrically connected; or directly connected or indirectly connected through a medium. The specific meanings of the foregoing terms in the present disclosure may be understood by a person skilled in the art according to specific circumstances.

Embodiment 1

Figure 5:
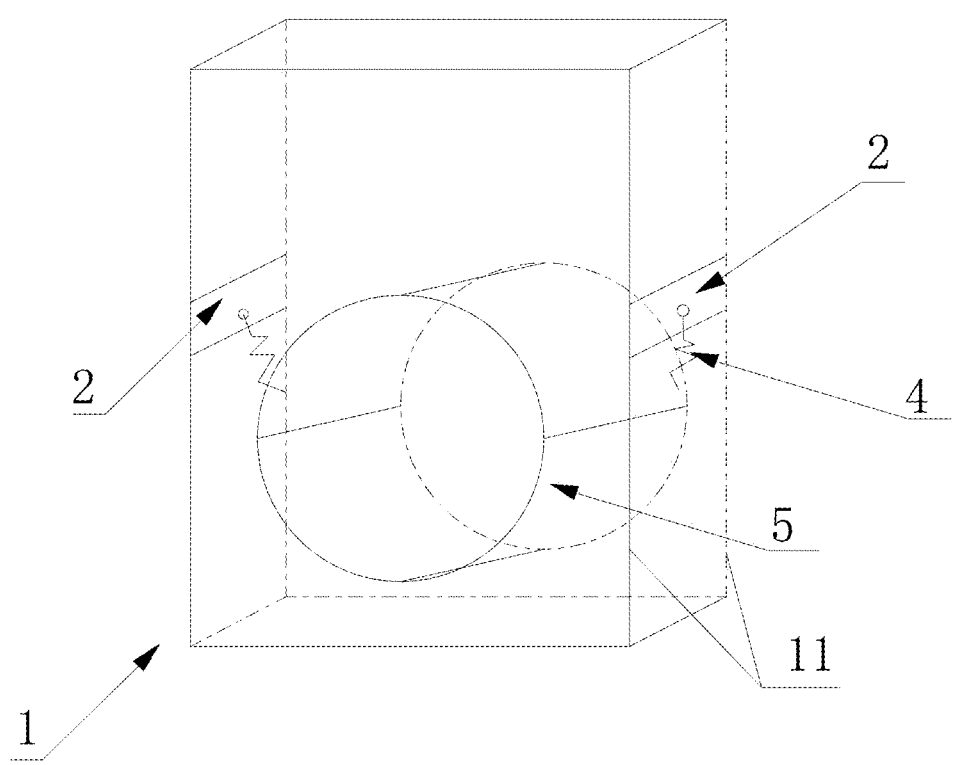
FIG. 5 is a schematic structural diagram of the laundry treatment apparatus.

As shown in FIG. 1 to FIG. 5, this embodiment provides a spring bearing beam 2, used in laundry treatment apparatus. As shown in FIG. 5, the laundry treatment apparatus includes a frame 1 and a laundry handling tub 5 disposed inside the frame. The laundry handling tub 5 is hooked to the spring bearing beams 2 on the frame 1 by using springs 4. The spring bearing beam 2 includes a body of strip-shaped, a first connection structure 21 is disposed on an upper side of the body, a second connection structure 22 is disposed on a lower side of the body, and the body is fixedly connected to a reinforcing member on the frame 1 by using the first connection structure 21 and/or the second connection structure 22.

In the foregoing solution, the body may be fixedly connected to the reinforcing member on the frame 1 by using the first connection structure 21 and/or the second connection structure 22. When the body is fixed to the reinforcing members on the frame 1 by using both the first connection structure 21 and the second connection structure 22, the fixing stability of the spring bearing beam is improved.

Preferably, the first connection structure 21 includes two connection structures respectively located at two ends of the upper side of the body, and the second connection structure 22 includes two connection structures that are respectively located at two ends of the lower side of the body. The first connection structure 21 and the second connection structure 22 may be a same connection structure or different connection structures.

Preferably, the first connection structure 21 and the second connection structure 22 are the same structure.

Preferably, the two connection structures of the first connection structure 21 and the two connection structures of the second connection structure 22 are disposed on the upper side and the lower side of the body up and down symmetrically.

In the foregoing solution, when the first connection structure 21 and the second connection structure 22 are arranged up and down symmetrically, a left side and a right side of the spring bearing beam 2 can be used interchangeably, and in an actual assembly process, there is no need to differentiate between the left side and the right side of the spring bearing beam 2, and only a back side and a front side of the bearing beam need differentiation, thereby saving time of adjusting a location of the bearing beam in the assembly process, and improving working efficiency.

Preferably, the first connection structure 21 includes through holes disposed on edges of the two ends of the upper side of the body, and the upper side of the body is fixed to the reinforcing members on the frame 1 by fasteners through the through holes, or the first connection structure 21 includes contact portions, located on edges of the two ends of the upper side of the body, in contact with the reinforcing members on the frame 1, and the contact portions are welded onto the corresponding reinforcing members; and/or the second connection structure 22 includes through holes disposed on edges of the two ends of the lower side of the body, and the lower side of the body is fixed to the reinforcing members on the frame 1 by fasteners through the through holes, or the second connection structure 22 includes contact portions, located on edges of the two ends of the lower side of the body, in contact with the reinforcing members on the frame 1, and the contact portions are welded onto the corresponding reinforcing members.

Preferably, a first spring hooking portion 23 is disposed on the body in correspondence to the first connection structure 21, a second spring hooking portion 24 is disposed in correspondence to the second connection structure 22, the first spring hooking portion 23 and the first connection structure 21 are located on a same side of the body, and the second spring hooking portion 24 and the second connection structure 22 are located on a same side of the body.

In the foregoing solution, when the spring bearing beam 2 is fixed to the reinforcing members on the frame 1 by using the first connection structure 21, the first spring hooking portion 23 is used to hook the spring 4, and when the spring bearing beam 2 is fixed to the reinforcing members on the frame 1 by using the second connection structure 22, the second spring hooking portion 24 is used to hook the spring 4; or when the spring bearing beam 2 is fixed to the reinforcing members on the frame 1 by using both the first connection structure 21 and the second connection structure 22, a spring hooking portion corresponding to a connection structure in a higher position in the first connection structure and the second connection structure is used to hook the spring 4.

Preferably, the two spring hooking portions are disposed on the body up and down symmetrically, so that after the spring bearing beam 2 is fixed to the reinforcing members on the frame 1, the spring hooking portion corresponding to the higher connection structure in the first connection structure 21 and the second connection structure 22 is used to hook the spring 4.

In the foregoing solution, the two spring hooking portions are disposed up and down symmetrically, so that when the first connection structure 21 is higher than the second connection structure 22, the first spring hooking portion 23 is used to hook the spring 4, and when the second connection structure 22 is higher than the first connection structure 21, the second spring hooking portion 24 is used to hook the spring 4.

Preferably, a projection portion 25 of strip-shaped is formed through stamping towards a side on a middle portion of the body in a length direction of the body, the two spring hooking portions include two notches that are longitudinally symmetrically formed on the projection portion 25. And the first connection structure 21 and the second connection structure 22 are respectively disposed on a planar structure above the projection portion 25 and a planar structure below the projection portion 25 on the body, referring to a reference numeral 26 in the figure. Preferably, irregular structures are formed on surfaces of side walls 27 and a top wall 28 of the projection portion 25, wherein the irregular structures include multiple uneven planes, and the planes transit smoothly or non-smoothly.

In the foregoing solution, the projection portion 25 has an irregular structure, helping to increase strength of the spring bearing beam 2. The body of the spring bearing beam 2 is a strip-shaped plate structure, the projection portion 25 is formed through stamping in the length direction of the strip-shaped structure towards a side perpendicular to the body. The projection portion 25 is a strip-shaped structure located on a middle portion of the body, so that the spring bearing beam 2 is symmetrical up and down. Therefore, the left side and the right side of the spring bearing beam can be used interchangeably, and in the actual assembly process, there is no need to differentiate between the left side and the right side of the spring bearing beam, thereby improving assembly efficiency.

Preferably, the projection portion 25 of strip-shaped includes the side walls 27 and the top wall 28, the side walls 27 and the top wall 28 do not transit smoothly, and the two spring hooking portions include a first notch formed on a side wall 27 on a side of the projection portion 25 of strip-shaped and the connected top wall 28 and a second notch formed on a side wall of the other side of the projection portion 25 of strip-shaped and the connected top wall 28.

In the foregoing solution, the first spring hooking portion 23 includes the first notch formed on the upper side wall and the connected top wall 28 of the projection portion 25, so that the first notch is used to hook spring 4 when the first connection structure 21 is higher than the second connection structure 22. Because the notch is formed on the upper side wall of the projection portion 25, a hook on an end portion of the spring 4 is inserted into the notch from top to bottom, and is supported by the top wall 28. Similarly, the second spring hooking portion 24 includes the second notch formed on the lower side wall and the connected top wall 28 of the projection portion 25, wherein the first notch is not communicated with the second notch, and the first notch and the second notch are separated by the top wall 28, so that the second notch is used to hook the spring 4 when the second connection structure 22 is higher than the first connection structure 21. The hook on the end portion of the spring 4 is inserted into the second notch on the side wall of the projection portion 25 from top to bottom, and is supported by a portion of the top wall 28 between the first notch and the second notch.

Preferably, an avoidance structure used to avoid the spring 4 is further disposed on the body, so that after the spring 4 is hooked to a spring hooking portion, there is a gap between a helical segment of the spring and the body.

In the foregoing solution, because portions of the body on two sides of the projection portion 25 have planar structures 26, when the spring 4 is hooked to the spring bearing beam, an angle of inclination between the spring 4 and the planar structures 26 (namely, vertical planes) on the two sides of the projection portion 25 is relatively small, and the spring is easily in frictional contact with the planar portions, and noise is easily generated, which does not facilitate hooking stability of the spring 4. Therefore, in the present disclosure, the avoidance structure is disposed, to prevent friction between the planar portions and the spring 4, and stably hook the spring 4 to the spring bearing beam.

Preferably, the avoidance structure is two concave portions 261 symmetrical that are formed through local curving-in on upper and lower sides of a surface of the body facing to the spring 4, and there is a gap between the spring 4 and a surface of the concave portion 261 located at the lower side of the bearing beam when the spring 4 is hooked to the spring hooking portion.

Preferably, the two concave portions 261 are respectively located on the planar structure 26 of the body above the projection portion 25 and the planar structure 26 of the body below the projection portion 25, the concave portions extend from the projection portion to edges of the body. The extension directions of the two concave portions are perpendicular to the projection portion, and widths of the concave portions 261 are gradually increased from edges of the projection portion to the edges of the body, to prevent contact between the helical segment of the spring 4 and the body.

Preferably, the two concave portions 261 and the two spring hooking portions are disposed on a same straight line perpendicular to the length direction of the body, and the four parts are symmetrically arranged up, down, left and right.

Preferably, the reinforcing member of the frame 1 of the laundry treatment apparatus includes four vertically positioned sheet metal members 11, the first connection structure 21 above the projection portion 25 and the second connection structure 22 below the projection portion 25 that are on the two ends of the body of the spring bearing beam 2 are separately fixed with two sheet metal members 11 on one side of the frame 1. A left connection structure of the first connection structure 21 on an upper-left side of the body and a left connection structure of the second connection structure 22 on a lower-left side of the body are fixed with one sheet metal member on the frame 1, and a right connection structure of the first connection structure 21 on an upper-right side of the body and a right connection structure of the second connection structure 22 on a lower-right side of the body are fixed with another sheet metal member on the frame 1.

Further, the top wall 28 of the projection portion has different heights, and locations of the first spring hooking portion 23 and the second spring hooking portion 24 on the top wall 28 are higher than adjacent portions on the top wall 28. From the view of a cross-section of the spring bearing beam 2, a ratio of a width of the projection portion to a width of the planar structure 26 above or below the projection portion is 1:2 to 3:2. Preferably, the ratio of the width of the projection portion to the width of the planar structure 26 above or below the projection portion is 1:1. The inventors have proven through a large quantity of experiments that when the ratio of the width of the projection portion to the width of the planar structure 26 above or below the projection portion is 1:2 to 3:2, the spring bearing beam 2 has relatively good bearing strength, and meets a safety condition.

In the present disclosure, the spring hooking portions are two notches formed on the projection portion. Preferably, a spring holder 3 is mounted on the notch, thereby improving an effect of hooking the spring 4. The spring holder 3 is a "U"-shaped structure. An insertion groove 31 is formed on an outer periphery of the U-shaped structure, for insertion fit with the notches, and a U-shaped groove in a middle portion of the U-shaped structure is used to fit with the hook of the spring 4. In the present disclosure, one spring bearing beam 2 corresponds to one spring holder 3, and the spring holder 3 is mounted on a higher spring hooking portion of the spring bearing beam.

Further, a first laundry handling tub and a second laundry handling tub are vertically disposed up and down in the frame. A mounting platform is mounted between the first laundry handling tub and the second laundry handling tub in the frame, and is used to mount drying equipment of each laundry handling tub, and other fittings, as shown in FIG. 1. The spring bearing beam is mounted in a location on the frame corresponding to the mounting platform, so that the mounting table can be fixedly connected to the spring bearing beam by using fasteners.

Embodiment 2

As shown in FIG. 6 to FIG. 10, this embodiment provides a frame of laundry treatment apparatus. The frame includes a horizontally-disposed square base 106, a vertical beam extending vertically upwards is disposed on each of four end corners of the base 106. And avoidance portions 114 bent towards a center of the base 106 of a washing machine are correspondingly disposed on two vertical beams on a same side, to form avoidance space 119 for mounting a curved side wall of a housing of the laundry treatment apparatus.

The avoidance portion is formed by setting two parallel portions inside and outside on the vertical beam of the frame and connecting them through an inclined portion, so that an inwardly curved flange structure is formed on the frame, to form the avoidance space for avoiding a curved bent portion disposed on the housing of the laundry treatment apparatus, and the housing of the laundry treatment apparatus can be correspondingly fit with and fixedly mounted on an outer side of the frame.

Figure 9:
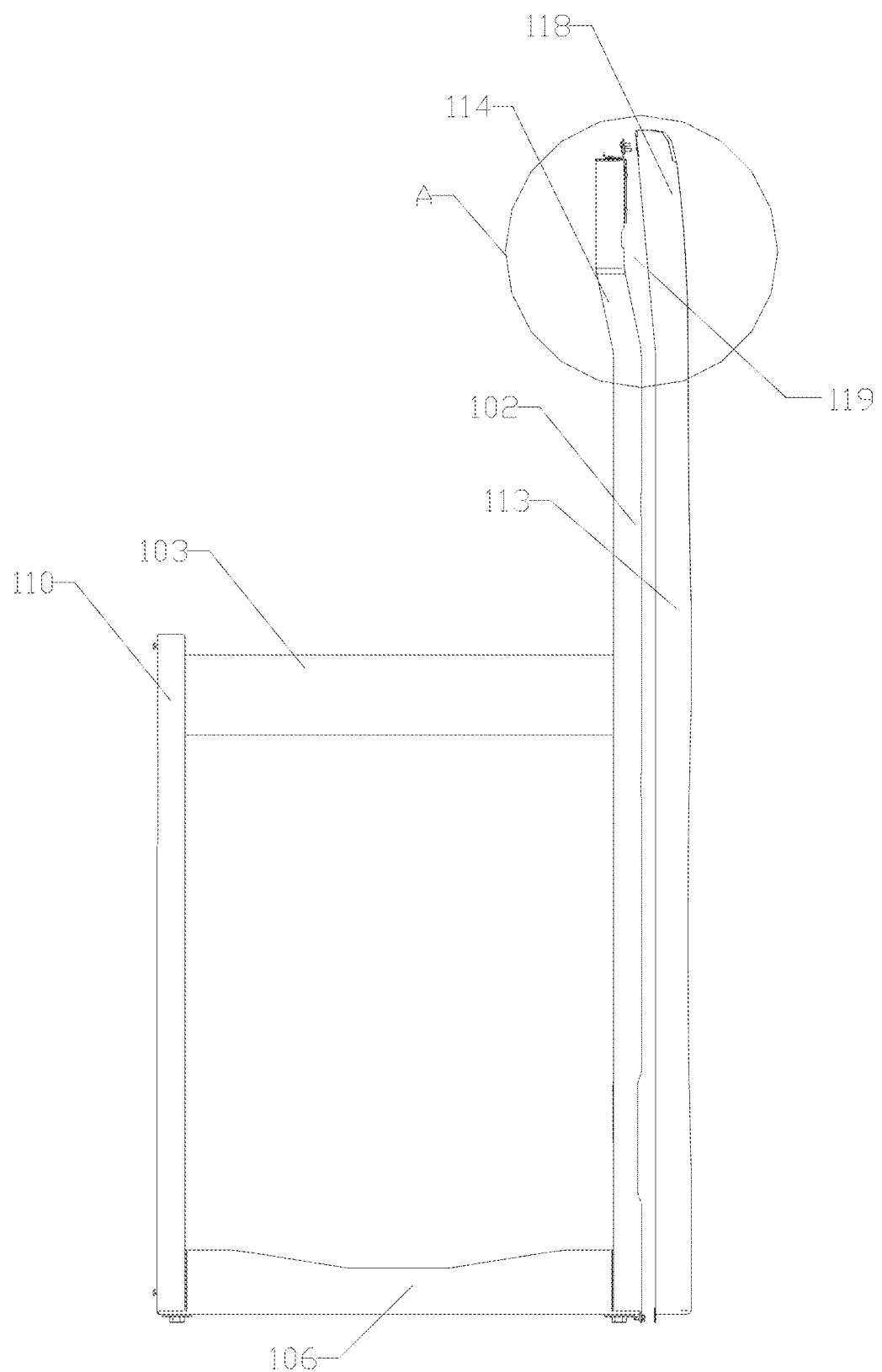
FIG. 9 is a schematic structural diagram of front panel assembly of a frame according to an embodiment of the present disclosure.
Figure 10:
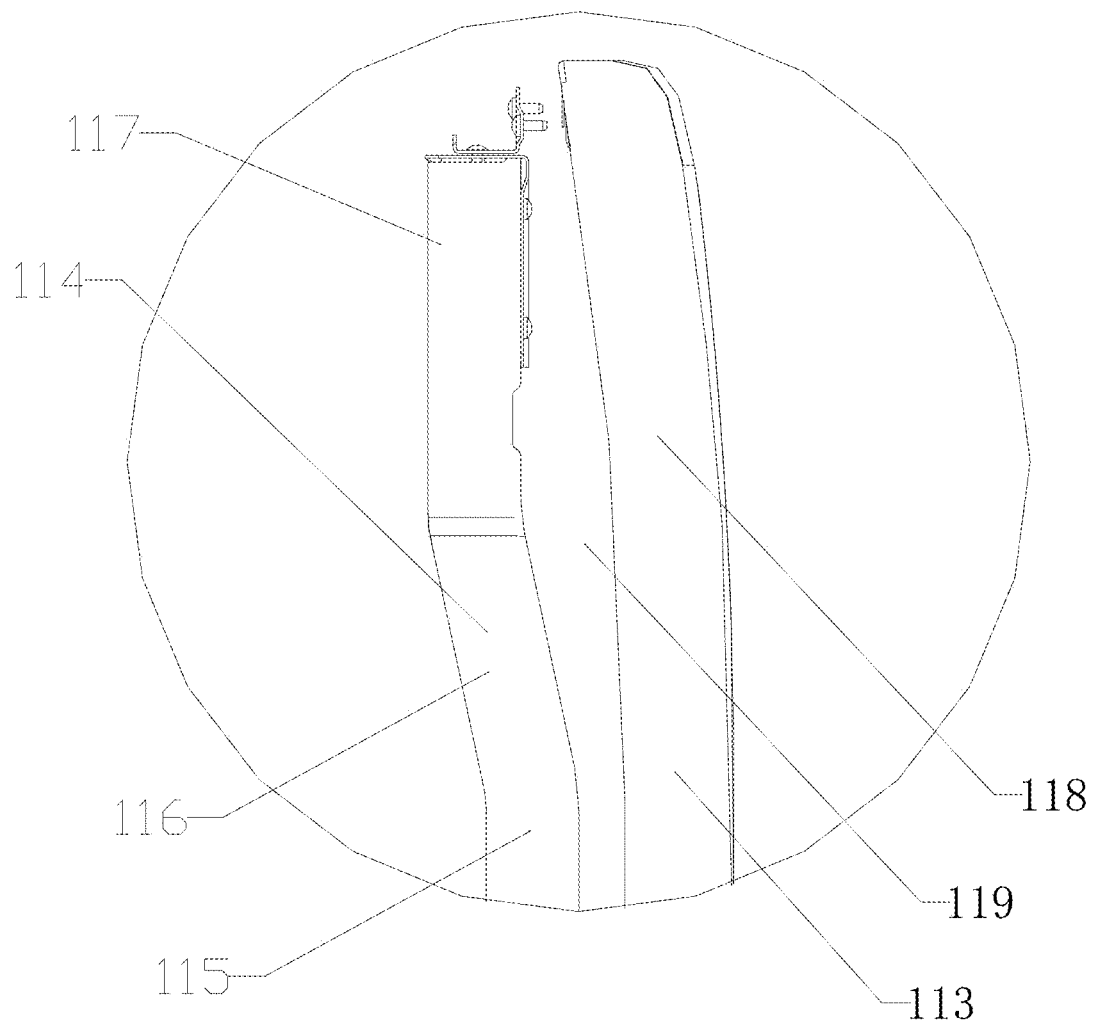
FIG. 10 is a schematic diagram of an amplified structure of a location A in FIG. 9 according to an embodiment of the present disclosure.

As shown in FIG. 9 and FIG. 10, in this embodiment, the avoidance portion 114 includes an inclined portion 116 which gradually inclines from bottom to top in a direction from a common side wall of the two vertical beams to an opposite side wall, and a lower end of the inclined portion 116 is connected with an upper end of a first vertical portion 115 of the vertical beam, and an upper end of the inclined portion 116 is connected with a lower end of a second vertical portion 117 of the vertical beam. Two parallel vertical extension portions are disposed on the vertical beam, so that the vertical beam can be tightly fit with and fixed to a side wall of the housing after avoiding, through the avoidance space, the bent portion disposed on the side wall of the housing, to ensure that the vertical beams and a front plate are mounted stably, and avoid outward projection of the side wall of the housing of the laundry treatment apparatus, thereby reducing a size of an entire machine, and improving assembly stability.

In this embodiment, the first vertical portion 115 is disposed further away from a center line of the base 106 relative to the second vertical portion 117. Preferably, the first vertical portion 115 and the second vertical portion 117 are parallel to each other, and extend in a direction of a vertical line.

In this embodiment, the avoidance portions 114 at a same height are respectively disposed on two vertical beams on a same side, and the avoidance portions 114 are symmetrically disposed on the two vertical beams with respect to a vertical left-right halving plane of the base 106, to ensure that the avoidance portions 114 are disposed at the same height, and therefore, effectively avoid a bent portion 118 on a side plate of the housing.

In this embodiment, the avoidance portion 114 is disposed on a top, and/or a bottom, and/or a middle portion of the vertical beam, so that avoidance portion is applied to a technical solution in which the inwardly bent portion 118 is disposed on any one of or a combination of a top portion, a middle portion, and a bottom portion of the side wall of the housing of the laundry treatment apparatus.

As shown in FIG. 9 and FIG. 10, in this embodiment, the bent portion 118 matched with the avoidance portion 114 is disposed on the side plate of the laundry treatment apparatus. The bent portion 118 gradually inclines and is bent from bottom to top in a direction from the common side wall of the two vertical beams to the opposite side wall. A lower end of the bent portion 118 is correspondingly in contact with the first vertical portion 115, and an upper end correspondingly abuts against the second vertical portion 117.

In this embodiment, the bent portion 118 is disposed on a top end of a front side plate 113 of the laundry treatment apparatus, the lower end of the bent portion 118 is at a same height as lower ends of inclined portions 116 disposed on two vertical beams in the front of the frame. The upper end of the bent portion 118 exceeds or is flush with top ends of the vertical beams, so that a rear side of the bent portion 118 abuts against and is fixedly connected with the top ends of the vertical beams.

As shown in FIG. 9 and FIG. 10, in this embodiment, the rear side of a body of the front side plate 113 is correspondingly fit with and fixedly connected with the first vertical portion 115 on lower portions of the two vertical beams in the front of the frame, there is a gap between the bent portion 118 disposed a top portion of the front side plate 113 and inclined portions 116 disposed on upper portions of the two vertical beams in the front of the frame to form avoidance space 119. And a rear side of an upper portion of the bent portion 118 abuts against and is fixedly connected with the second vertical portion 117 disposed on top portions of the two vertical beams in the front of the frame.

Certainly, in this embodiment, the avoidance portions may also be disposed on two vertical beams on a left side, a right side, and a rear side of the frame, so that the avoidance portions are applied to different models of laundry treatment apparatus.

Embodiment 3

Figure 6:
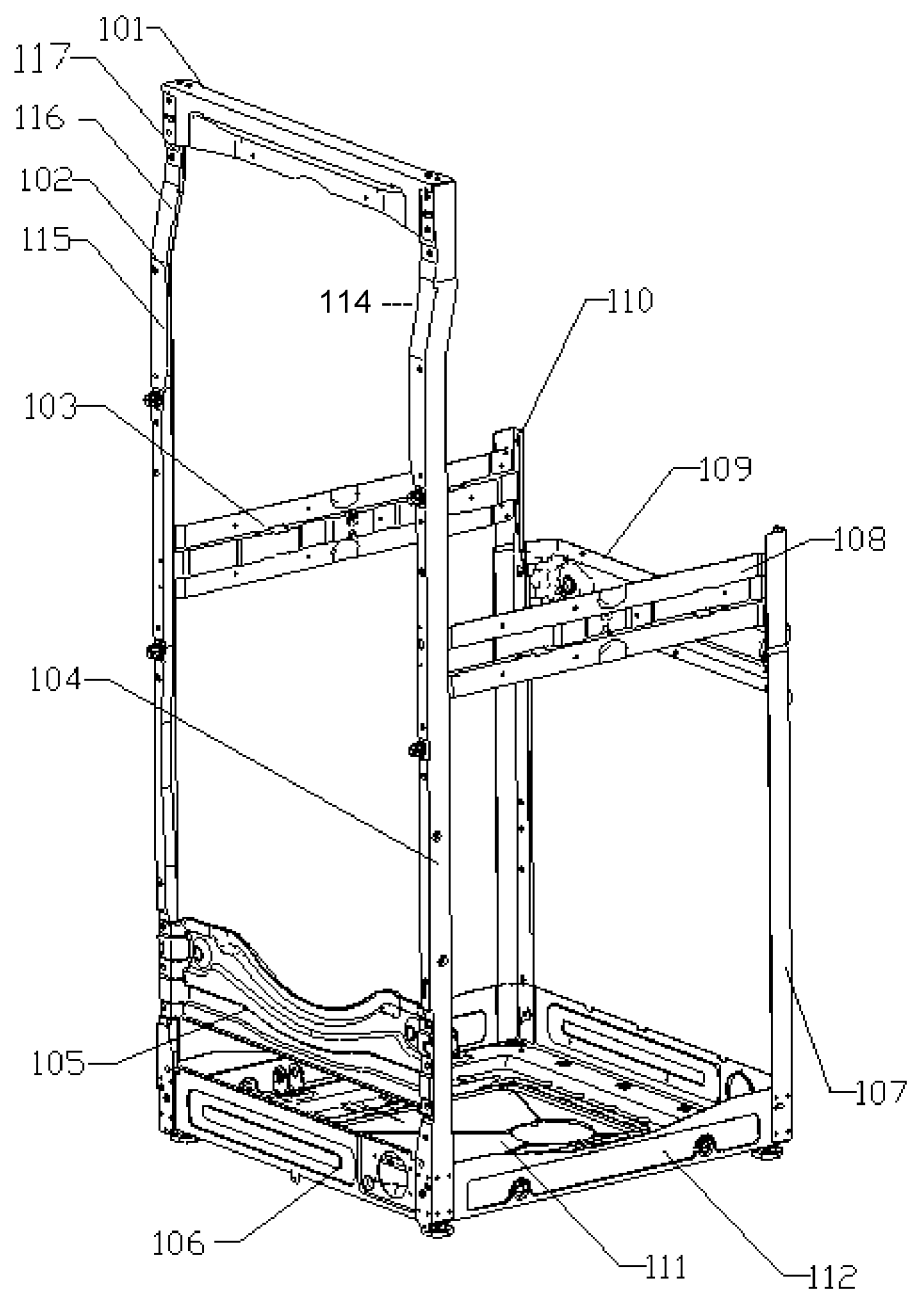
FIG. 6 is a schematic structural diagram of a frame according to an embodiment of the present disclosure.
Figure 7:
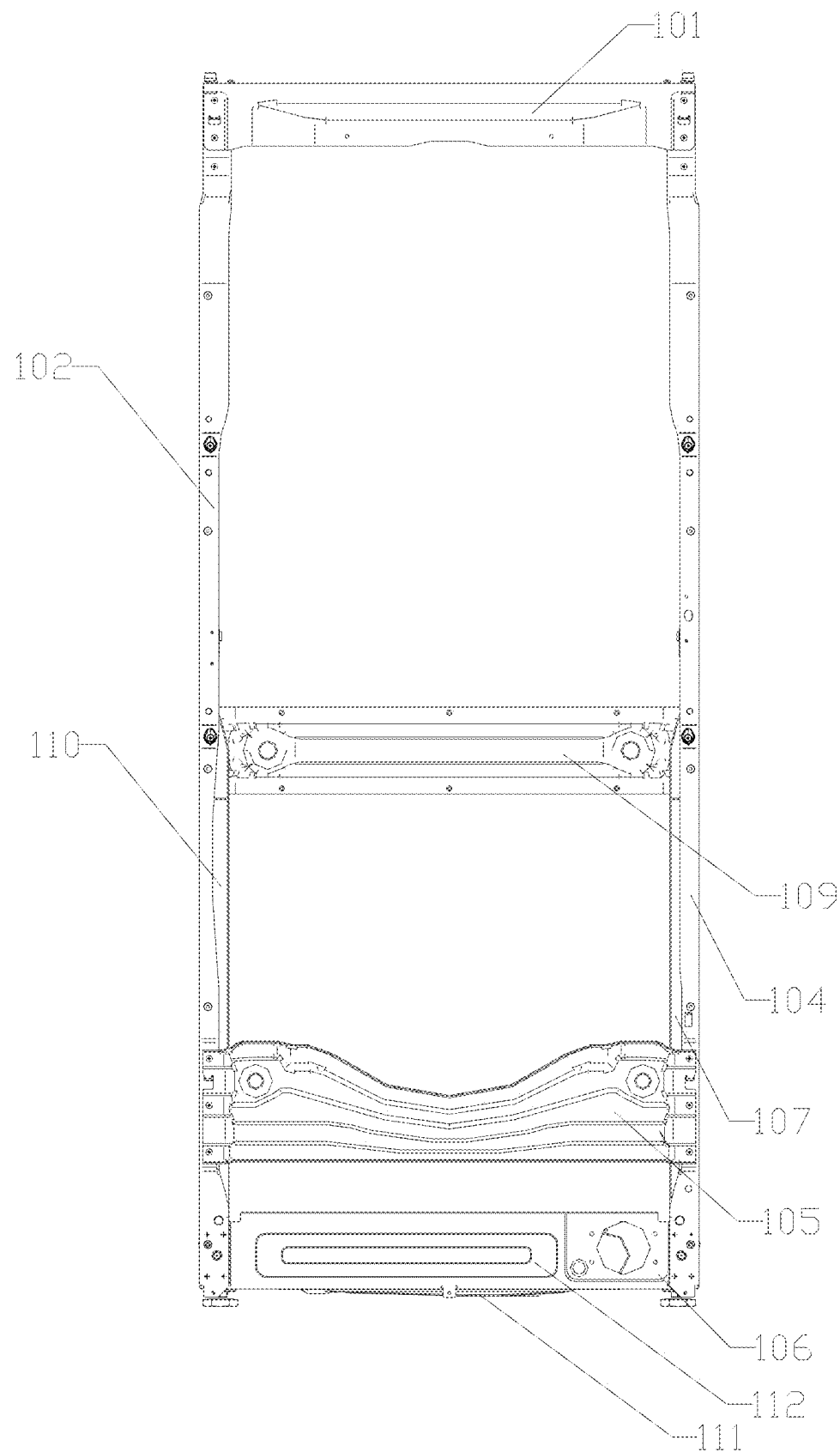
FIG. 7 is a schematic structural diagram of a front side view of a frame according to an embodiment of the present disclosure.
Figure 8:
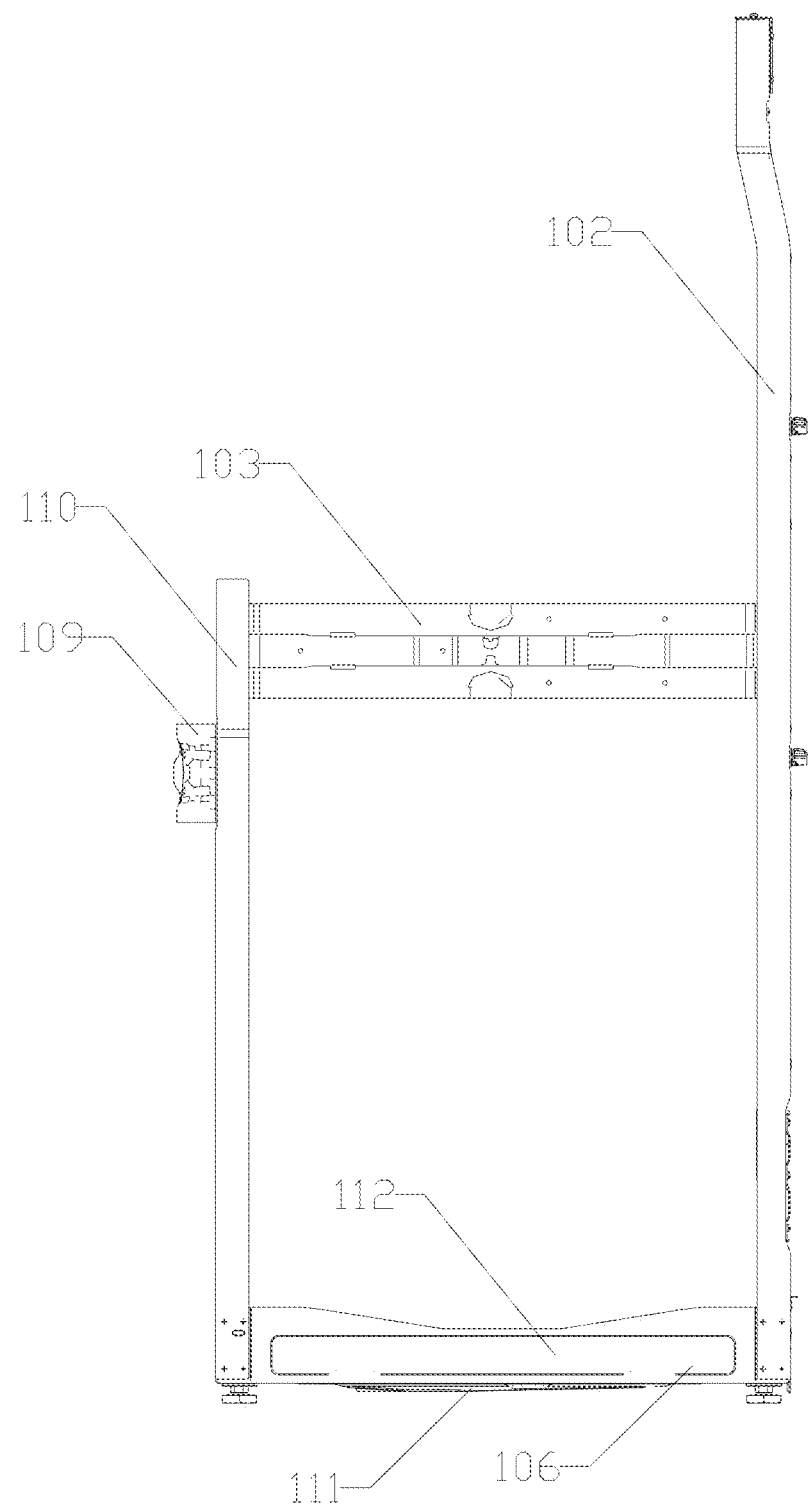
FIG. 8 is a schematic structural diagram of a left side view of a frame according to an embodiment of the present disclosure.

As shown in FIG. 6 to FIG. 8, this embodiment provides a frame of laundry treatment apparatus. The laundry treatment apparatus includes a first laundry handling tub and a second laundry handling tub that are vertically stacked up and down. The frame includes a horizontally-disposed square base 106. A vertical beam extending vertically upwards is disposed on each of four end corners of the base 106. Two front vertical beams extend upwards to exceed the top of the first laundry handling tub, and two rear vertical beams extend vertically upwards to a location between the second laundry handling tub and the first laundry handling tub. Adjacent vertical beams are connected by using at least one horizontally extending horizontal reinforcing member, to form the frame structure.

By using the foregoing arrangement, the two laundry handling tubs may be respectively mounted on an upper portion and a lower portion of the frame, and mounting fixing locations may be provided for the two laundry handling tubs. In addition, because the upper portion, a middle portion, and the lower portion of the entire frame are fixedly connected by using reinforcing members, so that the frame of the laundry treatment apparatus is stable and a support coefficient of an entire frame can be increased.

In this embodiment, input ports of the first laundry handling tub and the second laundry handling tub are disposed towards a front side of the frame, and two vertical beams on a side of the input ports are respectively a front-left vertical beam 102 and a front-right vertical beam 104. Preferably, a direction from the front side to a rear side of the frame is used as a reference, and the front-left vertical beam 102 and the front-right vertical beam 104 are respectively disposed on a left side and a right side of the loading ports. Preferably, the first laundry handling tub is vertically disposed above the second laundry handling tub. Further preferably, an axis of the first laundry handling tub and an axis of the second laundry handling tub are located on a same vertical plane, and the vertical plane overlaps a center of the base.

Preferably, in this embodiment, the first laundry handling tub is a laundry drying tub having only a drying function, and the second laundry handling tub is a water container having both washing and drying functions, so that a rear end of the first laundry handling tub is mounted on the frame by using a rear fixing plate that is vertically disposed on a rear end. The rear fixing plate covers the rear side of the frame, and the rear fixing plate is mounted at the upper part of the two rear vertical beams and correspondingly covers a height between the front vertical beams and the rear vertical beams, so that the first laundry handling tub is mounted on an upper region of the frame. The second laundry handling tub on a lower side is connected with a left horizontal reinforcing member and a right horizontal reinforcing member by using springs disposed on an upper portion of the second laundry handling tub, and is fixedly connected with a support bar and the base that are connected with a lower portion of the second laundry handling tub, so that the second laundry handling tub is mounted on a lower region of the frame.

As shown in FIG. 6 to FIG. 8, in this embodiment, the front-left vertical beam 102 is connected with a top end of a rear-left vertical beam 110 by using the left horizontal reinforcing member 103 (the left horizontal reinforcing member 103 is a spring bearing beam in Embodiment 1). And the front-right vertical beam 104 is connected with a top end of a rear-right vertical beam 107 by using the right horizontal reinforcing member 108 (the right horizontal reinforcing member 108 is a spring bearing beam in Embodiment 1). Preferably, the left horizontal reinforcing member 103 (the left horizontal reinforcing member 103 is a spring bearing beam in Embodiment 1) and the right horizontal reinforcing member 108 horizontally extend on a same horizontal plane. Further preferably, the left horizontal reinforcing member 103 (the left horizontal reinforcing member 103 is a spring bearing beam in Embodiment 1) and the right horizontal reinforcing member 108 (the right horizontal reinforcing member 108 is a spring bearing beam in Embodiment 1) are symmetrically disposed relative to a common vertical plane of the first laundry handling tub and the second laundry handling tub.

In this embodiment, a top portion of the front-left vertical beam 102 and a top portion of the front-right vertical beam 104 are connected by an upper horizontal reinforcing member 101, and a lower portion of the front-left vertical beam 102 and a lower portion of the front-right vertical beam 104 are connected by a lower horizontal reinforcing member 105. Preferably, the lower horizontal reinforcing member 105 is disposed close to or is fit with the base 106.

In this embodiment, an upper portion of the rear-left vertical beam 110 and an upper portion of the rear-right vertical beam 107 are connected by using a rear horizontal reinforcing member 109. Preferably, the rear horizontal reinforcing member 109 is disposed lower than the left horizontal reinforcing member 103 (the left horizontal reinforcing member 103 is a spring bearing beam in Embodiment 1) and the right horizontal reinforcing member 8. Further preferably, the rear horizontal reinforcing member 109 extends in a horizontal direction, and an upper side edge of the rear horizontal reinforcing member 109 is lower than a lower side edge of the left horizontal reinforcing member 103 (the left horizontal reinforcing member 103 is a spring bearing beam in Embodiment 1) and a lower side edge of the right horizontal reinforcing member 108 (the right horizontal reinforcing member 108 is a spring bearing beam in Embodiment 1), or the upper side edge of the rear horizontal reinforcing member 109, a lower side edge of the left horizontal reinforcing member 103 (the left horizontal reinforcing member 103 is a spring bearing beam in Embodiment 1), and a lower side edge of the right horizontal reinforcing member 108 (the right horizontal reinforcing member 108 is a spring bearing beam in Embodiment 1) overlap each other and are on a plane at a same height.

In this embodiment, the base 106 is a bottom plate 111 with a square outer periphery. A vertically bent flange 112 is disposed on the outer periphery of the bottom plate 111. Bottom ends of the vertical beams are respectively in support contact with corresponding end corners of the bottom plate 111, and at least two side faces of each of the vertical beams are fit with and are fixedly connected with an inner side of the flange 112.

As shown in FIG. 6 to FIG. 8, in this embodiment, each vertical beam has a vertical strip-shaped structure with an "L"-shaped cross-section, and each vertical beam with the "L"-shaped cross-section is parallel to and is in fit contact with the flange 112 at the corresponding end corner. Preferably, each vertical beam is away from the center of the base 106 relative to the flange, so that an inner wall of the vertical beam is correspondingly fit with an outer wall of the flange 112, and the inner wall of the vertical beam and the outer wall of the flange 112 are riveted and/or screwed in a corresponding fitting location. The vertical beam is disposed as a vertical strip-shaped board that has an "L"-shaped cross-section and is fit with a corresponding corner of the flange, so that at least two side surfaces of each of the vertical beams are correspondingly fit with the flange, to implement pre-positioning in a vertical beam mounting process, effectively improve assembly stability after the vertical beams are mounted, and further significantly improve support strength of the entire frame.

In this embodiment, each of the left horizontal reinforcing member 103 (the left horizontal reinforcing member 103 is a spring bearing beam in Embodiment 1), the right horizontal reinforcing member 108, the rear horizontal reinforcing member 109, the upper horizontal reinforcing member 101, and the lower horizontal reinforcing member 105 is formed by a vertically-disposed and horizontally-extending strip-shaped board. And two ends of each strip-shaped board are respectively fitted with vertical beams on a corresponding side, and then the two ends of the strip-shaped board and the vertical beams are riveted and/or screwed, to implement tight mounting between the horizontal reinforcing members and the vertical beams, and implement dual objectives of enhancing assembly convenience of the frame and improving support stability of the frame.

In this embodiment, the left horizontal reinforcing member 103 (the left horizontal reinforcing member 103 is a spring bearing beam in Embodiment 1) is disposed more close to the center of the base 106 relative to a vertical beam on a corresponding side, and two ends of an outer wall of the left horizontal reinforcing member 103 (the left horizontal reinforcing member 103 is a spring bearing beam in Embodiment 1) are correspondingly respectively fit with an inner wall of the front-left vertical beam with the "L"-shaped cross-section and an inner wall of the rear-left vertical beam 110 with the "L"-shaped cross-section, and the two ends and the inner walls are riveted and/or screwed in corresponding fitting locations.

In this embodiment, the right horizontal reinforcing member 108 is disposed close to the center of the base 106 relative to the vertical beams on the corresponding side, and two ends of an outer side wall of the right horizontal reinforcing member 108 are correspondingly respectively fit with an inner side wall 4 of the front-right vertical beam with the "L"-shaped cross-section and an inner side wall of the rear-right vertical beam 107 with the "L"-shaped cross-section, and the two ends and the inner side walls are riveted and/or screwed in corresponding fitting locations.

In this embodiment, the upper horizontal reinforcing member 101, the lower horizontal reinforcing member 105, and the rear horizontal reinforcing member 109 are disposed further away from the center of the base relative to the vertical beams on the corresponding sides, so that two ends of inner side walls of the upper horizontal reinforcing member 101 and the lower horizontal reinforcing member 105 are correspondingly respectively fit with an outer side wall of the front-left vertical beam 102 with the "L"-shaped cross-section and an outer side wall of the front-right vertical beam 104 with the "L"-shaped cross-section. Two ends of an inner side wall of the rear horizontal reinforcing member 109 are correspondingly fit with an outer side wall of the rear-left vertical beam 110 with the "L"-shaped cross-section and an outer side wall of the rear-right vertical beam 107 with the "L"-shaped cross-section, and the two ends and the outer side walls are riveted and/or screwed in corresponding fitting locations.

Preferably, a flange horizontally bent towards a rear side of the frame is disposed on an upper side edge of the upper horizontal reinforcing member 101, and the flange covers at least top ends of the front vertical beams, so that the upper horizontal reinforcing member 101 is correspondingly fit with and fixedly connected with the top end surfaces of the front-left vertical beam 102 and the front-right vertical beam 104, thereby further improving fixing strength between the upper horizontal reinforcing member 101 and the vertical beams, and effectively improving support stability of the frame.

In this embodiment, the frame further includes an upper-left horizontal reinforcing member and an upper-right horizontal reinforcing member. The top ends of the front-left vertical beam and the front-right vertical beam are respectively fixedly connected with the front ends of the upper-left horizontal reinforcing member and the upper-right horizontal reinforcing member, the upper-left horizontal reinforcing member and the left horizontal reinforcing member are located on a same vertical plane, the upper-right horizontal reinforcing member and the right horizontal reinforcing member are located on a same vertical plane, and rear ends of the left horizontal reinforcing member and the right horizontal reinforcing member are separately connected with the rear fixing plate of the first laundry handling tub, so that the entire frame forms an entire frame structure, and implement effective support and mounting fixing on a platform at the top of a washer (not shown in the drawings). Preferably, the upper-left horizontal reinforcing member and the upper-right horizontal reinforcing member are tightly mounted with the front vertical beams of the frame after being pre-assembled with the rear fixing plate of the first laundry handling tub, to simplify an assembly process and improve an assembly speed of the frame.

Embodiment 4

This embodiment provides a frame of laundry treatment apparatus. The frame in the foregoing embodiment is mounted in ordinary laundry treatment apparatus having only one laundry handling tub, to be applied to an ordinary washer or dryer or other equipment, so that after a bent portion is disposed on a side wall of a housing of any existing laundry treatment apparatus having only one laundry handling tub, avoidance portions can be disposed on corresponding vertical beams of the frame, to fixedly assemble the frame and the side wall of the housing.

The foregoing descriptions are merely preferred embodiments of the present disclosure, but are not intended to limit the present disclosure in any form. Although the present disclosure is disclosed above by using the preferred embodiments, the preferred embodiments are not used to limit the present disclosure. Any person familiar with this patent can make some changes or modifications by using the foregoing technical content within the scope of the technical solutions of the present disclosure, to obtain equivalent embodiments having equivalent changes. Any simple change, equivalent change and modification made based on the technical essence of the present disclosure within the content of the technical solutions of the present disclosure shall fall within the scope of the solutions of the present disclosure.

The invention claimed is:
1. A spring bearing beam, comprising:
 a strip-shaped body,
 a projection portion of strip-shape formed through stamping towards a side on a middle portion of the body in a length direction of the body, a first connection structure arranged on an upper part of the body and disposed on a planar structure above the projection portion on the body, a second connection structure arranged on a lower part of the body and disposed on a planar structure below the projection portion on the body, a first spring hooking portion disposed on the body in correspondence to the first connection structure, a second spring hooking portion disposed on the body in correspondence to the second connection structure, wherein the first spring hooking portion and the second spring hooking portion comprise two notches symmetrically formed on the projection portion in up and down direction, wherein the first spring hooking portion and the first connection structure are located on a same side of the body, and the second spring hooking portion and the second connection structure are located on a same side of the body, wherein, the body is configured to be fixedly connected with a reinforcing member arranged on a frame of a laundry treatment apparatus via the first connection structure and/or the second connection structure;

two concave portions symmetrically formed by being locally concaved on surfaces of the upper part and the lower part of the body for facing a spring, and configured such that, when the spring is hooked to the first spring hooking portion or the second spring hooking portion, there is a gap between the spring and a surface of the concave portion at the lower part of the body.

2. The spring bearing beam according to claim 1, wherein the first connection structure comprises two connection structures respectively located at two ends of the upper part of the body, and the second connection structure comprises two connection structures respectively located at two ends of the lower part of the body.

3. The spring bearing beam according to claim 2, wherein the two connection structures of the first connection structure on the upper part of the body and the two connection structures of the second connection structure on the lower part of the body are symmetrically disposed in up and down direction.

4. The spring bearing beam according to claim 2, wherein the first connection structure and the second connection structure have the same structure.

5. The spring bearing beam according to claim 1, wherein the first connection structure comprises through holes disposed on two ends of the upper part of the body, and the upper part of the body is configured to be fixed on the reinforcing member on the frame by fasteners through the through holes, or the first connection structure comprises contact portions, located on the two ends of the upper part of the body, for contact with the reinforcing member on the frame, and the contact portions are configured to be welded onto reinforcing member.

6. The spring bearing beam according to claim 1, wherein the first spring hooking portion and the second spring hooking portion are symmetrically disposed on the body in up and down direction;

when the first connection structure is higher than the second connection structure, the first spring hooking portion corresponding to the first connection structure is used to hook the spring after the spring bearing beam is fixed on the reinforcing member on the frame;

when the second connection structure is higher than the first connection structure, the second spring hooking portion corresponding to the second connection structure is used to hook the spring after the spring bearing beam is fixed on the reinforcing member on the frame.

7. The spring bearing beam according to claim 1, wherein the projection portion of strip-shape comprises side walls and a top wall, a transition between the side wall and the top wall is unsmooth, and the first spring hooking portion comprises a first notch formed on one side wall of the projection portion and the top wall, and the second spring hooking portion comprises a second notch formed on another side wall of the projection portion and the top wall.

8. A frame of a laundry treatment apparatus, comprising the spring bearing beam according to claim 1.

9. The spring bearing beam according to claim 1, wherein the second connection structure comprises through holes disposed on two ends of the lower part of the body, and the lower part of the body is configured to be fixed on the reinforcing member on the frame by fasteners through the through holes, or the second connection structure comprises contact portions, located on the two ends of the lower side of the body, for contact with the reinforcing member on the frame, and the contact portions are configured to be welded onto reinforcing member.

* * * * *